June 4, 1940.  E. W. LAGER  2,202,954
REFRIGERATION UNIT
Filed Sept. 16, 1937
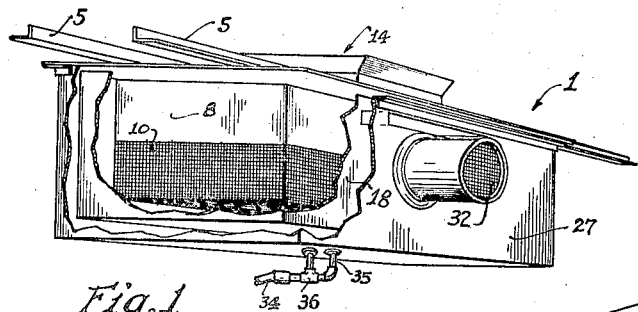
Fig. 1
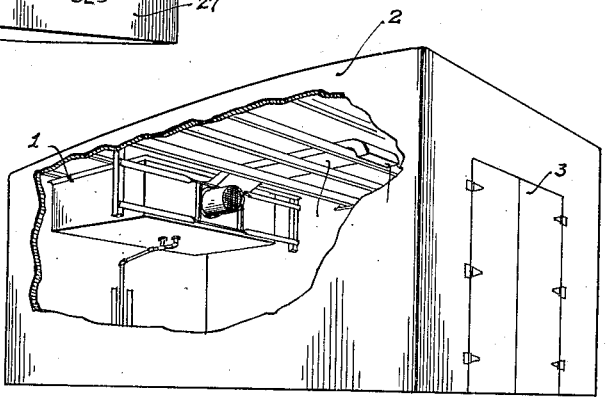
Fig. 2
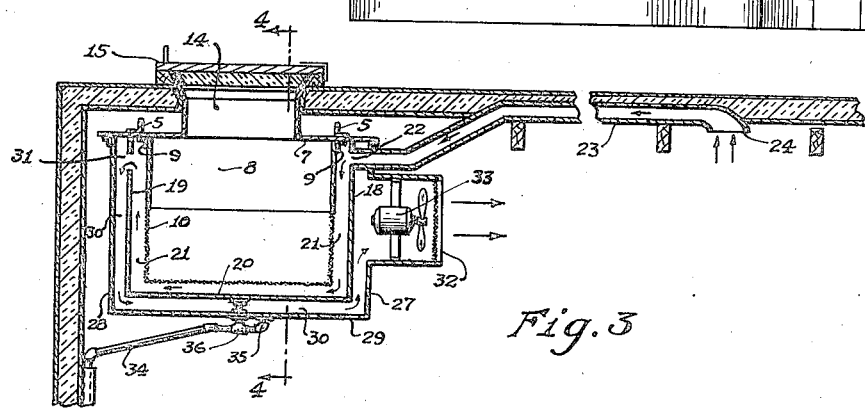
Fig. 3
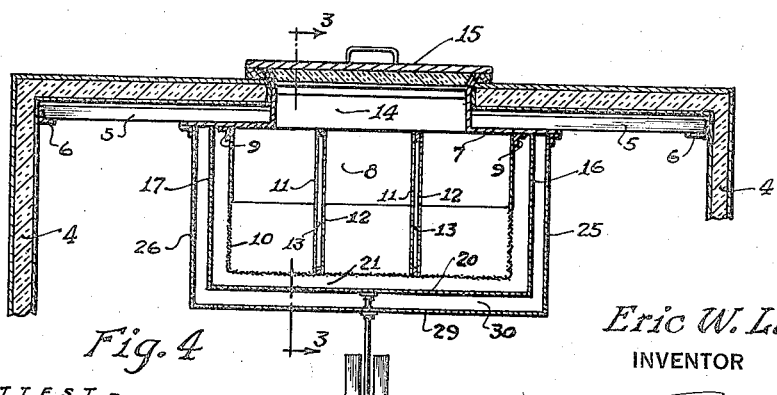
Fig. 4
Eric W. Lager
INVENTOR
ATTEST—
Herbert E. Birch
Wm. C. Meiser
BY 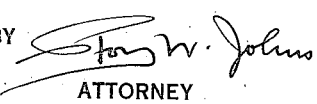
ATTORNEY Patented June 4, 1940

2,202,954

UNITED STATES PATENT OFFICE 2,202,954

REFRIGERATION UNIT

Eric Willard Lager, Chicago, Ill., assignor to Industrial Patents Corporation, Chicago, Ill., a corporation of Delaware Application September 16, 1937, Serial No. 164,235

8 Claims. (Cl. 62—133)

This invention relates to an improved refrigeration unit.

One of the objects of the invention is to provide an improved refrigeration unit.

Another object of the invention is to provide a refrigeration unit embodying an improved air cooling system.

Other objects of the invention will be apparent from the description and claims which follow.

The refrigeration unit of the present invention is adapted for use in enclosures of all types, for example, in rooms, railway cars and automobile truck bodies. By way of illustration, but without limiting the scope of the invention, the refrigeration unit will be described as used in an automobile truck body.

Reference is had to the drawing in which like characters of reference are used to designate similar elements.

Figure 1 is a perspective view, partly broken away, illustrating one embodiment of a refrigeration unit constructed in accordance with the present invention.

Figure 2 is a perspective view, partly broken away, of an automobile truck body in which there is adapted the unit shown in Figure 1.

Figure 3 is an enlarged longitudinal sectional view of a portion of the automobile truck body shown in Figure 2. This view is taken substantially on line 3—3 of Figure 4.

Figure 4 is an enlarged transverse sectional view taken substantially on line 4—4 of Figure 3.

In the drawing, the refrigeration unit 1 is shown adapted to enclosure 2 comprising an automobile truck body provided with doors 3. Unit 1 is preferably secured adjacent one end and near the ceiling of enclosure 2 and is rigidly affixed to side walls 4 as by cross members 5 and angle brackets 6.

Unit 1 comprises top 7 to which ice bunker 8 is rigidly affixed as by angle brackets 9. Bunker 8 may be of any suitable construction. In the present invention the lower portion 10 of bunker 8 is shown formed of foraminous material. Also bunker 8 may be vertically subdivided into a number of smaller compartments as by pairs of spaced partition walls 11 and 12 thus providing air passages 13 extending in the direction of movement of forced air currents hereinafter described. It will be seen that the partitioned structure of bunker 8 provides an increased outer surface area and also that the screened portion 10 permits direct contact of the air with the ice contained therein. Ice in chunk form is admitted to bunker 8 through hatchway 14 provided with door 15.

As shown in Figures 3 and 4, bunker 8 is surrounded by spaced side and end walls 16 and 17 and 18 and 19 and bottom 20 providing air flow chamber 21, the end wall 18 being provided with opening 22 communicating with air duct 23. Duct 23 is extended against the ceiling to the opposite end of enclosure 2 where it is provided with air intake opening 24.

Chamber 21 is surrounded by spaced side and end walls 25 and 26 and 27 and 28 and bottom 29 providing air flow compartment 30 communicating with chamber 21 through opening 31 provided in end wall 19. End wall 27 is provided with exhaust opening 32 in which is mounted draft fan 33. Fan 33 serves to provide a forced circulation of air in and about the truck body and through the refrigeration unit in which warm air is drawn from one end of the truck body through duct 23 into chamber 21, whence it is passed either through the openings in screen 10 and in direct contact with the ice contained within bunker 8 or in surface contact with bunker 8, thence through opening 31 and compartment 30 and is discharged through opening 32 at substantially the opposite end of the truck body.

In accordance with the present invention, the warm air after being forcibly drawn through chilling chamber 21 and in direct contact with the ice, is maintained in its path of movement for a period against the outer surface of chilling chamber 21 before being returned to the truck body proper.

The air by reason of its dual flow through and around the chilling chamber 21 is further decreased in temperature thereby providing a proportional increase in refrigeration per unit weight of ice. Further, the air during its movement around the chilling chamber tends to lose the excess moisture absorbed in its movement through the chilling chamber thereby providing a less humid atmosphere in the truck body proper.

The ice meltage in chamber 21 is drained through line 34 vented to the atmosphere through the flooring of the truck. The moisture lost by the air while being carried through the compartment and around the chamber is drained through line 35 which communicates with line 34 at T36.

I claim:

1. In a refrigeration unit, a chilling means, a chamber provided with air inlet means and enclosing the chilling means in spaced relation therewith, a compartment provided with a chilled air outlet enclosing the chamber in spaced relation therewith, an air passage between the chamber and the compartment and means adapted to cause a forced circulation of air in and through the chamber and compartment.

2. In a refrigeration unit, a chilling means, a chamber provided with air inlet means and enclosing the chilling means in spaced relation therewith, a compartment provided with a chilled air outlet enclosing the chamber in spaced relation therewith, an air passage between the chamber and the compartment and means including a fan adapted to cause a forced circulation of air in and through the chamber and compartment.

3. In a refrigeration unit, a chilling means, a chamber provided with air inlet means and enclosing the chilling means in spaced relation therewith, a compartment provided with a chilled air outlet enclosing the chamber in spaced relation therewith, an air passage between the chamber and the compartment and means including a fan adapted to cause a forced circulation of air in and through the chamber and compartment, the compartment providing means for passing the chilled air passing from the chamber in surface contact with the outer chamber walls.

4. In a refrigeration unit, a chilling means, a chamber provided with air inlet means and comprising side and end walls and a bottom enclosing the chilling means and in spaced relation therewith, a compartment provided with a chilled air outlet comprising side and end walls and a bottom enclosing the chamber and in spaced relation with the side and end walls and bottom of the chamber, an air passage between the chamber and the compartment and means including a fan adapted to cause forced circulation of air in and through the compartment and chamber.

5. In a refrigeration unit, a chilling means, a chamber provided with air inlet means and comprising side and end walls and a bottom enclosing the chilling means and in spaced relation therewith, a compartment provided with a chilled air outlet comprising side and end walls and a bottom enclosing the chamber and in spaced relation with the side and end walls and bottom of the chamber, an air passage between the chamber and the compartment and means including a fan adapted to cause forced circulation of air in and through the compartment and chamber, the compartment providing means for holding for a period the air passing from the chamber in surface contact with the outer chilled walls of the chamber.

6. In a refrigeration unit, a chilling means comprising an ice bunker having a base portion of foraminous material and provided with pairs of spaced partition walls providing air passages therethrough, a chamber provided with an air inlet enclosing the chilling means in spaced relation therewith, a compartment provided with an air outlet enclosing the chamber in spaced relation therewith, an air passage between the chamber and the compartment and means including a fan adapted to cause a forced circulation of air in and through the chamber and the compartment.

7. In a refrigeration unit, a chilling means comprising an ice bunker having a base portion of foraminous material and provided with pairs of spaced partition walls providing air passages therethrough, a chamber provided with an air inlet enclosing the chilling means in spaced relation therewith, a compartment provided with an air outlet enclosing the chamber in spaced relation therewith, an air passage between the chamber and the compartment and forcing means including a fan for causing circulation of air in and through the chamber and the compartment, portions of the air circulated through the chamber being circulated in surface contact with the bunker, other portions of the air being passed in direct contact with the ice contained within the bunker.

8. In a refrigeration unit, a chilling means comprising an ice bunker having a base portion of foraminous material and provided with pairs of spaced partition walls providing air passages therethrough, a chamber provided with an air inlet comprising side and end walls and a bottom enclosing the chilling means in spaced relation therewith, a compartment provided with an air outlet and comprising side and end walls and a bottom enclosing the chamber, the side and end walls and bottom of the compartment being in spaced relation with the side and end walls of the chamber, an air passage between the chamber and the compartment and means including a fan adapted to cause a forced circulation of air in and through the chamber and the compartment.

ERIC WILLARD LAGER.